INVENTORS
Meryl C. Burns
George J. Giel, Jr.
Robert J. Stahl
BY
Howard M. Dustin.

INVENTORS
Meryl C. Burns
George J. Giel, Jr.
Robert J. Stahl
BY
Howard M. Dustin INVENTORS
Meryl C. Burns
George J. Giel, Jr.
Robert J. Stahl
BY Howard M. Dustin

MAGNETIC DECIMAL ACCUMULATOR

Filed Feb. 12, 1951 7 Sheets-Sheet 4

INVENTORS.
Meryl C. Burns.
George J. Giel, Jr.
Robert J. Stahl
BY
Howard M. Dustin INVENTORS
Meryl C. Burns
George J. Giel, Jr.
Robert J. Stahl
Howard M. Dustin INVENTORS
Meryl C. Burns
George J. Giel, Jr.
Robert J. Stahl
BY
Howard M. Dustin.

INVENTORS
Meryl C. Burns
George J. Giel, Jr.
Robert J. Stahl
BY
Howard M. Dustin 2,867,379

MAGNETIC DECIMAL ACCUMULATOR

Meryl C. Burns, Richmond, George J. Giel, Jr., Berkeley, and Robert J. Stahl, Redwood City, Calif., assignors to Marchant Calculators, Inc., a corporation of California Application February 12, 1951, Serial No. 210,592

27 Claims. (Cl. 235—61)

This invention relates to calculating machines and more particularly to computing and registering elements for such machines employing moving magnetic media for storing and delivering information.

It is a well known practice to induce a semi-permanent magnetism in portions of moving magnetic media in accordance with some intelligence, and to employ the magnetism so induced for producing a delayed manifestation of the same intelligence. Probably the widest application of this practice at present is in the field of magnetic wire or tape recording either for the direct recording and reproduction of sound or for the recording of transient signals which are to be subsequently viewed on a cathode ray oscilloscope.

In the calculating machine art, the above practice is principally applied either in the substitution of magnetic media for the punched cards of the well known Hollerith system or for the "memory" inputs and outputs of large electronic computers. In the present invention, on the other hand, this principle is utilized by employing a moving magnetic medium as a direct and integral part of a computing mechanism.

In the machine disclosed herein, the calculating process consists of adding a selected value to a magnetically accumulated value, and is based on either a mechanical time delay or a physical displacement of the magnetizing components. The accumulated value determines the time relative to an index time at which the computation is initiated, and the selected value determines the amount of time delay, following such initiation, before the result is recorded. Therefore, the result is represented by the sum of the initiation time, with reference to an index time, plus the delay time. The result is recorded by its storage on a magnetic accumulator and becomes the new accumulated value which is thereafter used to initiate a subsequent calculation.

It is therefore an object of this invention to detect a magnetized portion of a magnetic medium and to demagnetize said portion in response to such detection.

Another object of this invention is to magnetize a selected portion of a magnetic medium and employ such magnetized portion for computation, by selectively demagnetizing that portion and magnetizing a second portion indicative of the result of the computation.

Another object of the invention is to demagnetize an information-carrying portion of magnetized material at substantially the same time the information so carried is detected and employed in computation.

Another object of the invention is to demagnetize a magnetized portion and magnetize an index portion of a mangetizable medium by clearing the machine.

Another object of the invention isto synchronize the operation of an indexing circuit with the movement of a magnetic medium.

Another object of the invention is to visually display a numerical representation of a selectively magnetized portion of a magnetic medium.

Another object of the invention is to synchronize the operation of a stroboscopic system with the movement of a magnetic medium for displaying a numerical representation of a selectively magnetized portion of such medium.

Another object of the invention is to select an item of calculation by presetting a decade counter to such a value as to cause magnetization of that portion of a magnetic medium corresponding to the sum of the item selected and the item represented by a previously magnetized portion.

Another object of the invention is to demagnetize a magnetized portion of such moving magnetic medium upon detection of that magnetization during the calculation process, but to prevent such demagnetization upon detection of the magnetized portion for displaying the represented numeral value.

Other objects and features of the invention will become apparent from the detailed description to follow of two different embodiments of the invention that are illustrated in the drawings in which.

Figure 1:
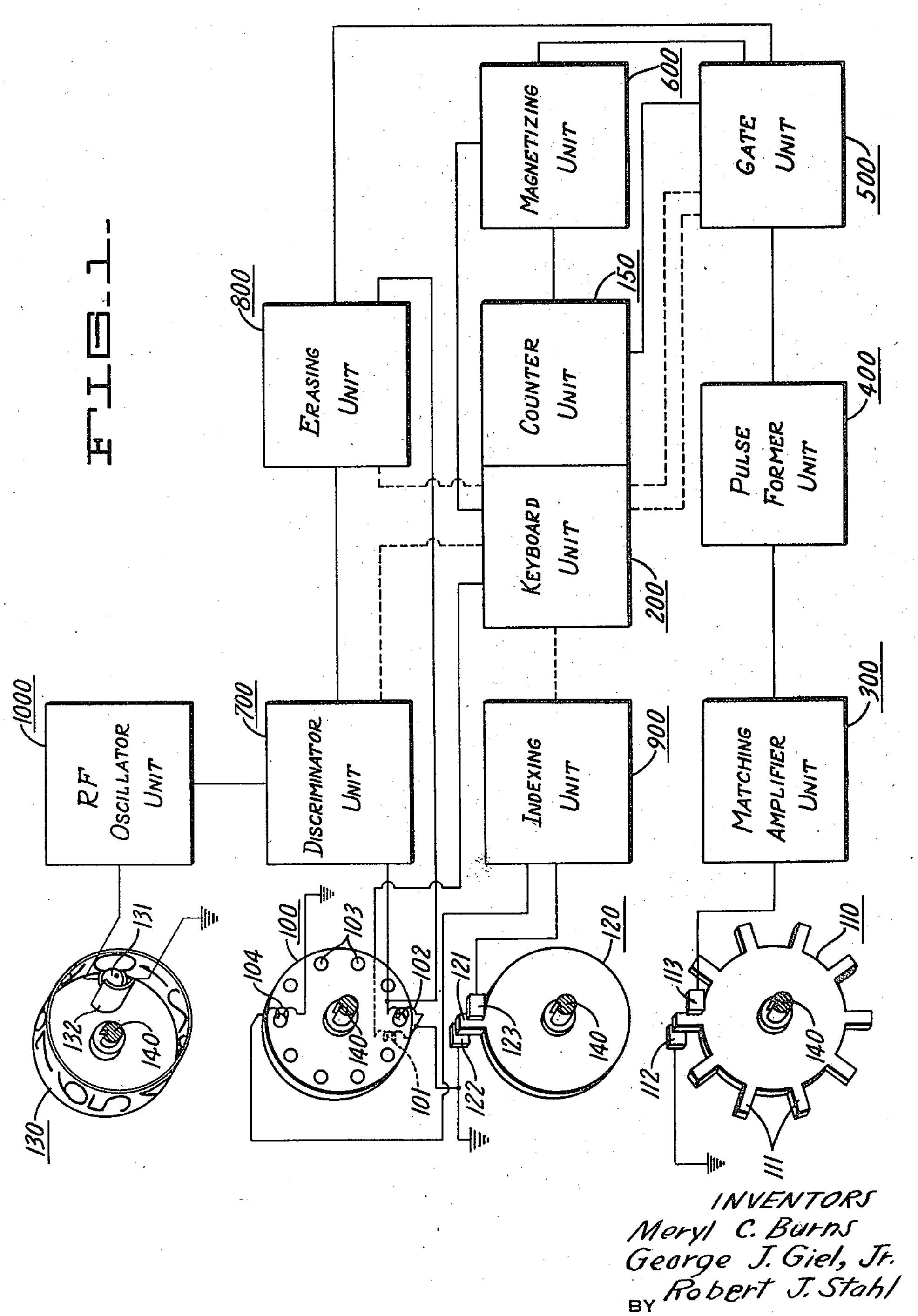
Fig. 1 is a block diagram of the first embodiment of the invention, schematically illustrating the principal mechanical parts and electronic units of the machine.

In the following description, all tubes are of the conventional vacuum type and all grid and cathode bias and plate supply means are conventional, except as otherwise noted, and are adapted in each case in a manner well known in the art, to the described use of the individual tubes; therefore, such conventional circuit elements and parameters will not be described in detail. Connecting terminals between units are assigned identical reference numerals for convenience of interrelation of the various units.

*General operation*

The preferred embodiment of the present invention, illustrated in block diagram in Fig. 1, is a single order adding mechanism having a rotating magnetic accumulator with one portion thereof magnetized, an electronic gate which is opened in response to a detection of the magnetized portion of the accumulator, an electronic counter which is enabled to operate by the opening of the electronic gate, a selection mechanism for presetting the counter, an electrostatic pulse generator for advancing the counter when the latter is enabled to operate, an erasing circuit for opening the aforesaid gate and for demagnetizing the magnetized portion at the beginning of a calculation, and a magnetizing circuit, controlled by the counter at the end of a calculation to close the gate and to magnetize a second portion of the accumulator representing the calculation result. Pulse-conducting connections between units are represented in Fig. 1 as solid lines, whereas control connections are shown as dashed lines.

Depression of a selected numeral key in a keyboard unit 200 presets an arithmetic unit comprising a decade counter unit 150 to a condition representing the value of the selected digit. Subsequent depression of an add key of the keyboard permits operation of the erasing circuit to demagnetize the magnetized portion of the accumulator and to transmit a pulse to a gate unit 500 for opening this gate. The gate unit constantly receives counting pulses which are generated in an electrostatic timing pulse generator 110 and which are amplified in a matching amplifier unit 300. When the gate unit is opened, it passes the aforesaid counting pulses to the counter unit 150, advancing the counter one count for each such pulse.

The pulse generator wheel 110 has ten evenly spaced arms 111, and is fixed to and rotates clockwise (as viewed in Fig. 1) about its axis with a constantly rotating shaft 140. As disc 110 rotates, each of its ten arms 111 passes, in turn, between a pair of stationary pickup plates 112 and 113. Plate 112 is grounded and plate 113 is connected to the input side of matching amplifier unit 300 in such a way that each arm 111, in passing between the pickup plates, electrostatically generates a pulse which is fed to the matching amplifier unit. The amplifier unit transforms the weak pulses generated in the above described high impedance electrostatic circuit into power amplified pulses which are thereupon fed to a pulse former unit 400. The pulse former unit shapes these pulses in preparation for counting and feeds them to gate unit 500. Thus, when depression of the add key causes the gate unit 500 to be opened, and appropriately amplified and shaped pulse is fed into the counter unit each time a pulse is generated by disc 110. The counter is advanced by each such pulse until it reaches a tenth, or zero, count, when it will have advanced a number of counts equal to the tens complement of the selected preset digit.

When the counter reaches a tenth count, it feeds a pulse to a magnetizing unit 600 which relays the pulse to the gate unit 500, closing that gate and preventing further counting pulses from entering the counter unit. Upon receipt of the pulse from the counter unit, the magnetizing unit also feeds a pulse through a closed switch in the keyboard unit to a transducing head comprising a magnetizing coil 101 adjacent one face of a rotating magnetic accumulator disc 100, the magnetizing pulse being timed by the end of the count to magnetize a selected portion of the accumulator disc.

Disc 100 is axially fixed to and rotates with shaft 140. In the present embodiment, the disc is formed of non-magnetic material. Ten magnetic inclusions 103, hereinafter designated as "slugs," are permanently fixed in appropriate holes evenly spaced in the disc on the periphery of a circle described about the axis of the shaft as its center. Each slug represents an associated digit 0–9, counting clockwise as viewed in Fig. 1. The magnetizing coil 101 and a second transducing head comprising an erasing coil 102 form a yoke which straddles the periphery of disc 100. The arrangement is such that during the rotation of disc 100, each slug 103 passes between and closely adjacent coils 101 and 102. One end of each of these coils is connected to ground. The coils are so oriented relative to the moving slugs that a positive pulse through coil 101 to ground magnetizes any slug which is adjacent that coil during the pulse. On the other hand, a positive pulse through coil 102 to ground demagnetizes any magnetized slug adjacent thereto during such pulse.

One slug, hereinafter designated as the "zero" slug, stands magnetized at the beginning of any operation after the machine has been cleared. As disc 100 rotates, the magneized zero slug induces a pulse on coil 102 each time it passes adjacent that coil. If a numeral key and the add key have been depressed, the pulse induced on coil 102 by the magnetized slug operates a circuit which demagnetizes the same slug. Therefore, a magnetized slug is employed for initiating its own demagnetization, and at the same time it initiates operation of a decade counter which causes magnetization of another slug representative of the value of the numeral key depressed.

The demagnetizing circuit in general includes a discriminator unit 700 which is coupled to coil 102 and which is energized by the aforesaid pulse induced on that coil by the magnetized slug. A normally closed gate in the discriminator unit is opened by depression of the add key, allowing pulses from coil 102 to be fed through the discriminator unit to an erasing unit 800. A gate in the erasing unit is opened by depression of any numeral key and closes itself after passing one pulse, this gate hereinafter being designated a "one-shot" gate. The erasing unit gate, when opened, passes one pulse from the discriminator unit to another section of the erasing unit which is thereby caused to form an erasing pulse. The erasing pulse is fed back to the same coil 102 to demagnetize the magnetized slug before the latter has rotated away from coil 102.

The counting circuitry in general includes the gate unit 500 and the counter unit 150. Gate 500 is coupled to the erasing unit and is opened in response to the above-mentioned pulse through one-shot gate in the erasing unit. Therefore, the counting pulses which are generated by disc 110 are passed through gate 500 to the counter unit. The rotational phase relationship between the ten arms of disc 110 and the ten slugs of disc 100 is such that a counting pulse is formed at substantially the same time each slug 103 passes under coils 101 and 102; but the circuit timing is such that the first counting pulse which passes through gate unit 500 is that pulse corresponding to the slug following the magnetized slug, i. e., following the zero slug in the present example. Therefore, when the add key is depressed, the counter is advanced one step for each slug following the zero slug, and when the counter reaches the tenth count, the number of slugs that have passed between coils 101 and 102 following the zero slug, is equal to the tens complement of the selected digit. The slug which is under the magnetizing coil 101 at the time the counter reaches the tenth count is thereupon magnetized by the chain of action described above from counter unit 150 to magnetizing unit 600 to magnetizing coil 101. It will be recalled that shaft 140 rotates clockwise, and that slugs 103 are numbered from 0–9 in a clockwise direction; therefore, the slug which is magnetized by an addition to zero corresponds to the digit selectively preset into the counter unit by depression of a numeral key. Since the zero slug, i. e., the originally magnetized slug, is demagnetized when it is detected during a calculation, and since one new slug, i. e., that slug corresponding to the sum of the addition of the selected digit to zero, is magnetized during the operation, one slug and one only stands magnetized at the end of any such operation. The newly magnetized slug then replaces the zero slug as the reference index, and subsequent additions are performed in the identical manner described above, adding the selected preset integer to the new index number.

Depression of the clear key in the keyboard unit operates four keyboard switches. First, it momentarily closes a switch for opening the one-shot gate in the erasing unit 800. The second clear key switch opens the gate in the discriminator unit 700, allowing the first pulse thereafter induced in coil 102 by the magnetized slug to pass through the opened discriminator unit gate and through the opened one-shot gate in the erasing unit. An erasing pulse is thereby formed in the erasing unit and is fed back to coil 102 to demagnetize the detected slug as described above.

Normally, the above-mentioned pulse from the discriminator unit to the erasing unit opens the gate unit 500, but during clearance, it is necessary to prevent the opening of this gate so that the counter will not be advanced. For this purpose, the third clear key switch uncouples the gate unit from the erasing unit.

The fourth switch operated by the clear key actuates an indexing unit 900 which indexes the accumulator disc 100 by remagnetizing the zero slug. An electrostatic index disc 120 having a single arm 121 is permanently mounted on and rotates with the above-mentioned shaft 140 so that disc 120 rotates in synchronism with discs 100 and 110. As disc 120 rotates, arm 121 passes between a pair of pickup plates 122 and 123 which are arranged in the same manner as are the plates 112 and 113 associated with disc 110 and described above. Arm 121 is phased to pass between plates 122 and 123 at substantially the same instant the zero slug 103 in disc 100 passes adjacent an index coil 104. The pulse picked up by plates 122 and 123 during each rotation of disc 120 is fed into indexing unit 900. When the fourth switch, described above, is operated by the clear key, the indexing unit is enabled to form a magnetizing pulse upon receipt of the indexing pulse from disc 120. The magnetizing pulse so formed is fed to the index coil 104 and magnetizes the zero slug 103 in disc 100, thereby indexing that disc to zero in preparation for a subsequent operation.

*Display of results*

As each pulse induced on coil 102 by a magnetized slug is fed into the discriminator unit 700, it is relayed by that unit to a stroboscopic numeral display system.

An opaque numeral drum 130 is fixed to and rotates with shaft 140, thereby rotating in synchronism with the above-described discs 100, 110 and 120. The numerals 0–9 are evenly spaced around the periphery of drum 130 and are so formed in the drum surface as to be transparent or translucent. A lamp 131, which may, for example, be a neon glow tube, is fixed to the frame of the machine and situated within the drum adjacent the inside drum surface. Lamp 131 is connected to the discriminator unit 700 and is energized by the above-mentioned pulse coupled from the discriminator unit to the display system. A reflector 132 is fixed between lamp 131 and the drum axis and reflects light from the lamp in such a direction that only the drum area immediately adjacent the lamp is illuminated. The arrangement is such that the illuminated area corresponds to substantially the area of any numeral on the drum. The phase relationship between the numerals on drum 130 and the slugs 103 on disc 100 is such that each numeral 0–9 is adjacent lamp 131 and in a position to be illuminated at substantially the same time the corresponding slug 103 is adjacent coils 101 and 102. Therefore, when a magnetized slug is detected by coil 102, the pulse thereby formed is fed through the discriminator unit 700 to lamp 131, illuminating the corresponding numeral on drum 130. That numeral is illuminated with each revolution of drum 130 and disc 100 until the slug is demagnetized. One convenient rotational frequency of shaft 140, and therefore of numeral drum 130 and disc 100, is 60 revolutions per second. Using this frequency, the selected numeral is illuminated sixty times each second and appears to the eye to be continuously illuminated.

It has been found that by illuminating the stroboscopic lamp 131 with bursts of radio frequency voltage, higher luminous efficiency can be obtained. Furthermore, the use of external electrodes for applying the R. F. voltage to the lamp increases lamp life by reducing internal sputtering. In order to make use of these features in the present invention, the above-mentioned stroboscopic pulses from discriminator unit 700 may be fed into an R. F. oscillator unit 1000 wherein they drive an R. F. oscillator which transmits a burst of R. F. voltage to lamp 131 for the duration of each driving pulse. Therefore lamp 131 is illuminated during the same intervals as described above, and the lamp illumination is, again, apparently continuous.

*Matching amplifier unit*

The matching amplifier unit 300 (Figs. 1 and 2) receives double ended counting pulses from the ten-arm electrostatic pulse generator 110, amplifies the pulses, and feeds them to the pulse former unit 400.

Figure 2:
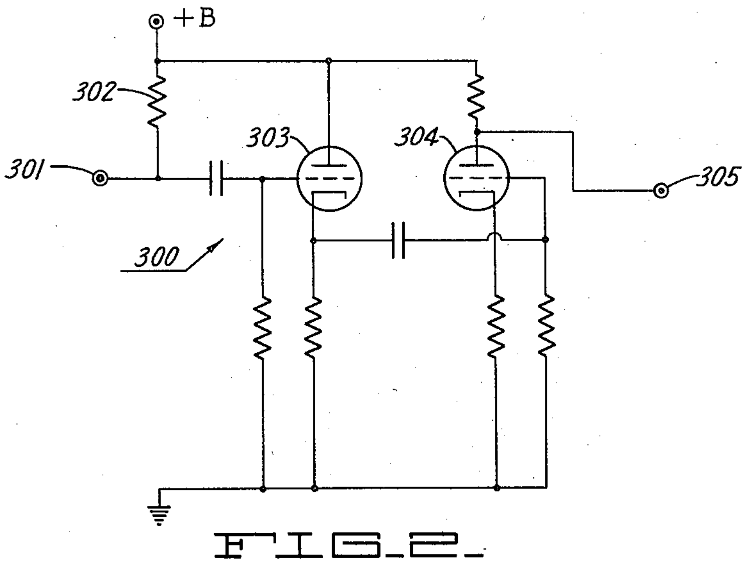
Fig. 2 is a wiring diagram of the matching amplifier unit.

An input terminal 301 (Fig. 2) connects the ungrounded pickup plate, i. e., plate 113, of generator 110 (Fig. 1) to a +B source through an impedance, shown as a resistor 302 (Fig. 2). Each time an arm 111 of disc 110 passes between plates 112 and 113, a capacitive circuit is completed from +B through impedance 302, terminal 301, plate 113, the arm 111, and plate 112 to ground. A pulse of current therefore flows from +B toward ground while the area of incidence between arm 111 and plates 112 and 113 increases, and conversely, current flows in the opposite direction as the incident area subsequently decreases. The current pulses through impedance 302 cause directional voltage drops across that impedance, resulting in a pulse at terminal 301, this pulse having a leading positive component. A pulse having both a positive and negative component will hereinafter be referred to as a "double-ended" pulse. The pulse at terminal 301 is electrostatically coupled to the control grid of a cathode follower tube 303 which transforms the high impedance input from the electrostatic disc 110 into a low impedance cathode output. The output of tube 303 is electrostatically coupled to the control grid of an amplifier tube 304 and the anode output of the latter tube is fed to the pulse former unit 400 at a terminal 305.

*Pulse former unit*

The output pulses from matching amplifier unit 300 are coupled to the pulse former unit 400 which amplifies, clips, and shapes these pulses. The shaped pulses are further amplified and fed to gate unit 500.

Figure 3:
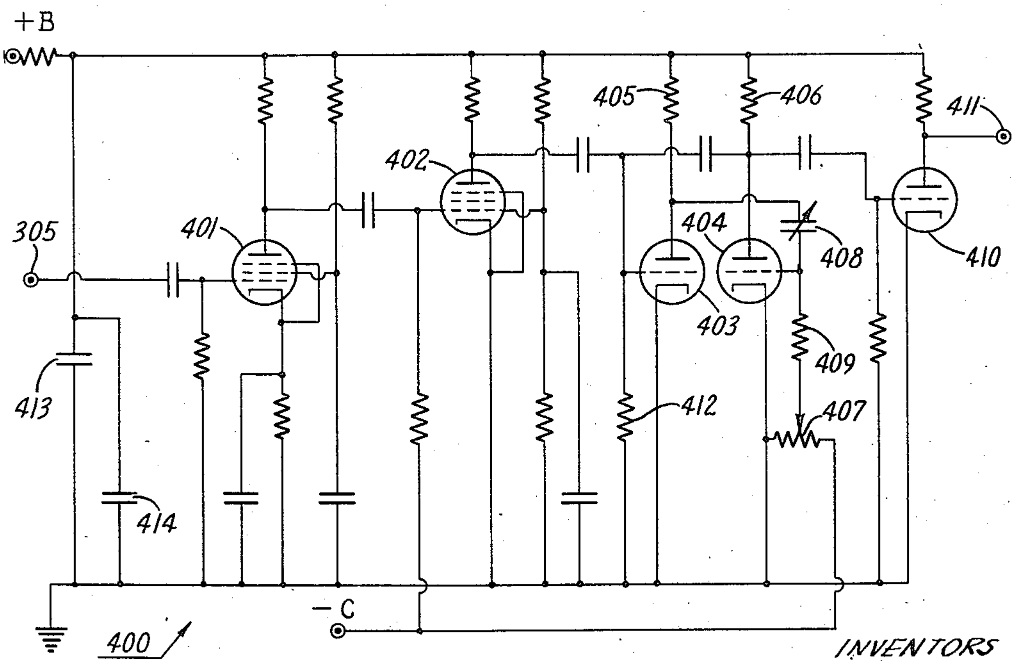
Fig. 3 is a wiring diagram of the pulse former unit.

The previously mentioned amplified doubled-ended pulses from matching amplifier unit 300 are electrostatically coupled to the control grid of an amplifier tube, shown as pentode 401 (Fig. 3) where they are amplified. The double-ended plate output pulse of tube 401 is fed through a capacitive coupling to the control grid of a discriminator tube, shown as pentode 402. The control grid of the tube 402 is resistively connected to a source −C of negative potential to bias that tube well below cut-off. Therefore, tube 402 conducts during only the positive half cycles of the double-ended pulses fed to its control grid and has a negative pulse anode output.

The anode output of tube 402 is capacitively coupled to a "univibrator" or one-shot multivibrator comprising tubes 403 and 404. The control grid of tube 403 is connected to ground through a grid bias resistor 412, biasing that tube so that it normally conducts at saturation. Tube 404 is biased below cutoff by connecting its control grid through a grid resistor 409 to a potentiometer resistor 407 which is connected between a source −C of negative potential and ground. Tubes 403 and 404 receive their anode potentials from a common +B source through plate resistors 405 and 406, respectively. Each negative pulse from discriminator tube 402 is impressed upon the control grid of tube 403, cutting off the latter tube and raising its anode potential due to the decreased drop across anode resistor 405. The positive surge at the anode of tube 403 is coupled through a capacitor 408 to the control grid of tube 404, biasing the latter tube to conduction, and thereby lowering its anode potential. The negative surge at the anode of tube 404 is electrostatically coupled to the control grid of tube 403 to assist in cutting off the latter tube. The raised grid potential of tube 404 is exponentially reduced to −C through resistors 409 and 407 and conduction in that tube is cut-off. When tube 404 ceases to conduct, its anode potential rises and the positive pulse so formed is capacitively coupled to the grid of tube 403, causing the latter tube to resume conduction.

The output from the univibrator is obtained from the anode of tube 404 and is therefore a negative, substantially square, pulse whose width is independent of the width of the driving pulse. It will appear that the width of the output pulse from the univibrator may be controlled by varying the time during which tube 404 conducts. Since the conduction time of tube 404 depends upon the time required to reduce that tube's raised grid potential to —C, the output pulse width may be controlled by varying the time constant of the drain circuit, i. e., by varying capacitor 408, or resistors 409, or 407. Such variable controls are therefore shown on capacitor 408 and resistor 407. Although these circuit elements are shown as variable, as are other similar circuit elements throughout the drawings, they may obviously be replaced by elements having fixed optimum values.

It has been found that the +B power supply to all the tube anodes in the pulse former unit may fluctuate undesirably during operation of that unit. To suppress such fluctuations, a voltage smoothing circuit comprising parallel condensers 413 and 414, is connected between the +B supply and ground.

The shaped negative pulse output from the univibrator is capacitively coupled to the control grid of an amplifier tube 410, and the resulting positive pulse output from the anode of tube 410 is fed, at terminal 411, to the input side of gate unit 500.

*Gate unit*

As explained hereinbefore, after the add key has been depressed to initiate a calculation, the first time the magnetized slug in disc 100 passes under coil 102, the resultant pulse is fed through the discriminator unit 700 and the erasing unit 800 to the gate unit 500, opening the latter to allow counting pulses from the pulse former unit 400 to enter the counter unit 150. At the end of the calculation, a negative pulse from the magnetizing unit 600 closes the gate unit 500, blocking further counting pulses from the counter unit.

The gate unit (Fig. 4) consists of a gated amplifier comprising tubes 501 and 502, and a conventional, Eccles-Jordan type trigger circuit comprising tubes 503 and 504. The gated amplifier controls the transmission of counting pulses from the pulse former unit to the counter unit and is opened and closed by the flip-flop action of the trigger circuit. Conduction is caused to alternate between the two tubes of the trigger circuit by the abovementioned "opening" and "closing" pulses from the erasing unit and the magnetizing unit, respectively. The erasing unit 800 and the magnetizing unit are removed from the influence of the trigger circuit and therefore from each other by a respective cathode follower tube 505 or 506 interposed between each side of the trigger circuit and its associated input.

Figure 6:
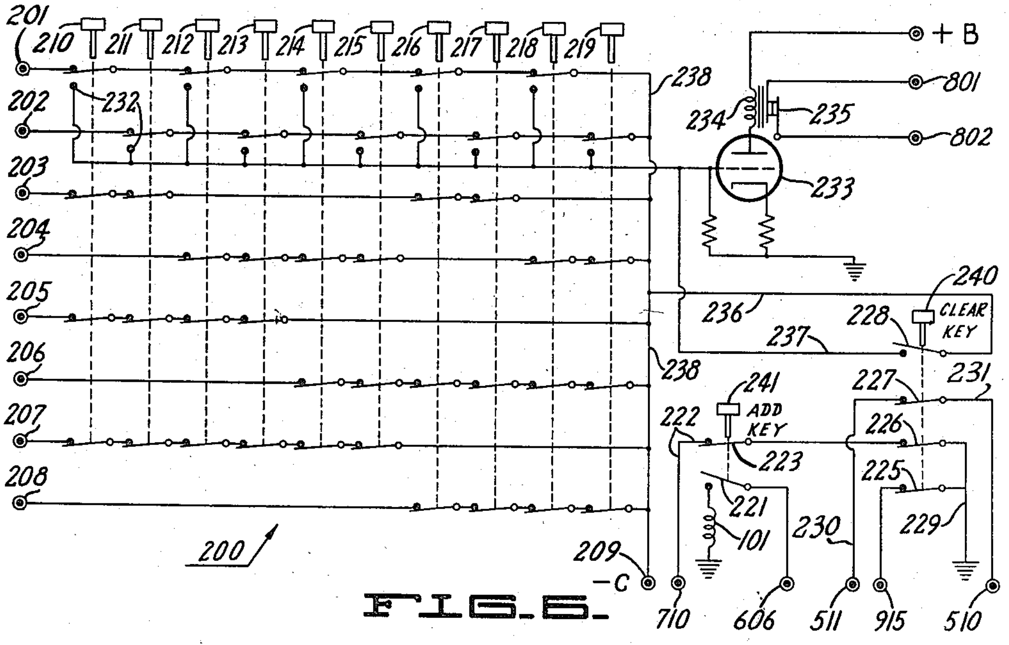
Fig. 6 is a wiring diagram of the keyboard unit, schematically illustrating the selection and control keys.

The pulse from the erasing unit for causing the gate to open, is received at terminal 507 where it is capacitively coupled to the control grid of normally conducting cathode follower tube 506. It will appear from the description of the erasing unit that this pulse is negative, and therefore causes the cathode potential of tube 506 to drop. The negative pulse at the cathode of tube 506 is capacitively coupled to the control grid of normally conducting trigger circuit tube 504, cutting off conduction in the latter tube and causing the normally nonconducting tube 503 to be biased to conduction. The circuit from the cathode of tube 503 to ground is normally completed through a terminal 511 (Figs. 4 and 6), a lead 230, a normally closed clear key switch 227, a lead 231, a terminal 510, and a parallel cathode resistor 513 and smoothing capacitor 514.

The anode of tube 503 is connected to the control grid of normally conducting gating tube 502, so that when tube 503 begins to conduct, its anode potential drops and biases tube 502 to decreased conduction, causing the cathode potential of the latter tube to drop. The cathode of tube 502 is connected to the cathode of amplifier tube 501 which is normally biased well below conduction by its high cathode potential; therefore, the drop in cathode potential of tube 502 raises the bias of tube 501 to slightly below cut-off opening the "gate."

The previously mentioned positive output pulses from the pulse former unit 400 are impressed upon the control grid of tube 501 through terminal 411. When the gate is closed, i. e., when the grid potential of tube 502 is raised, tube 501 is biased so far below conduction that the positive input pulses on its control grid are insufficient to cause conduction. However, when the gate is open, i. e., when tube 502 is biased to cut-off, tube 501 is biased so close to conduction that the positive input pulses to its control grid cause the tube to conduct. Each positive pulse amplified by tube 501 causes a negative pulse anode output from that tube and is electrostatically coupled to the input side of counter unit 150 at terminal 508. Thus, the opening pulse from the erasing unit reverses the state of conduction in the trigger circuit opening the gate and allowing counting pulses to enter the counter unit 150.

At the end of a calculation, the previously mentioned pulse from the magnetizing unit for causing the gate to close, is received at terminal 509 and is capacitively coupled to the control grid of the cathode follower 505, which is normally conducting. It will appear from the description of the magnetizing unit that this pulse is negative and therefore causes the cathode potential of tube 505 to drop. The negative pulse at the cathode of tube 505 is capacitively coupled to the control grid of trigger circuit tube 503, biasing the latter tube below cut-off and again reversing the state of conduction in the trigger circuit. As tube 503 is cut off, its anode potential is raised and impressed upon the control grid of gate tube 502, causing the latter to resume conduction. Conduction of tube 502 raises its cathode potential and biases amplifier tube 501 well below conduction, closing the gate so that no further counting pulses can enter counting unit 150. The anode voltage source +B for all tubes of the gate unit is stabilized by a capacitor 512 by-passed to ground.

*Counter unit*

Depression of a numeral key of the keyboard presets counter unit 150 to a condition corresponding to the selected digit. Subsequent depression of the add key results in the counter being advanced to the tenth, or zero, count, thereby advancing a number of steps equal to the tens complement of the selected digit. Upon completing its count to tenth or zero, the counter unit triggers magnetizing unit 600 which magnetizes a new slug 103 and closes gate unit 500.

Figure 5:
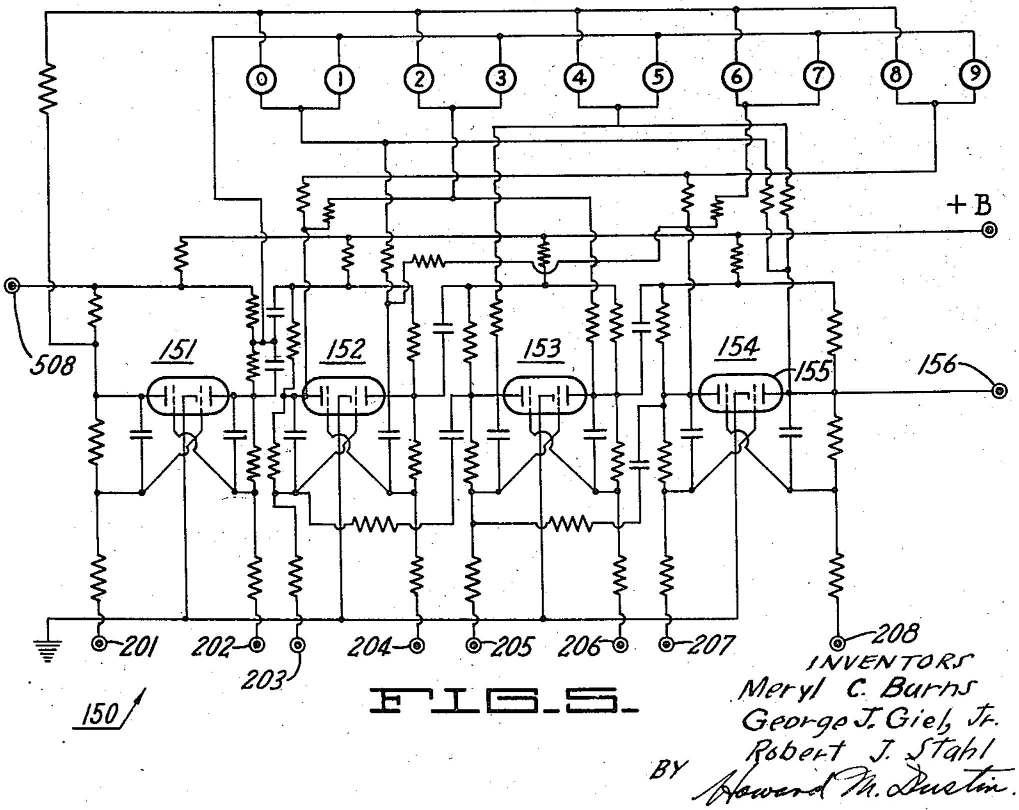
Fig. 5 is a wiring diagram of the counter unit.

Referring to Fig. 5, the counter unit comprises a conventional coded binary decade counter, such as shown and fully described in the R. C. A. Review (1946), volume VII, page 438 et seg. This counter consists of a chain of four Eccles-Jordan type trigger circuits 151–154, arranged for a straight binary count but coded for a count of ten by a conventional feedback from circuit 153 to circuit 152 and from circuit 154 to circuit 153. The grid of each tube in the counter is normally biased, through a respective terminal 201–208, to a source of negative potential. The counter may be preset to a representation of any selected digit by interrupting the grid bias to one tube of each trigger circuit in accordance with the decade code, thereby biasing to conduction each tube whose negative grid bias is interrupted, so that the collective status of the four trigger circuits represents the selected digit.

The interruption of the grid potentials of these tubes, and consequently the presetting of the counter, is under control of the keyboard unit. Each terminal 201–208 (Figs. 5 and 6) from the counter unit is connected through a respective row of ten numeral selection switches to a common source 209 of —C grid bias potential. The numeral selection keys for the digits 0–9 are schematically represented by vertical dashed lines, each bearing a respective reference numeral 210–219. Depression of any numeral key is effective to open the four switches under the associated dashed line. For example: depression of the No. 3 key 213 opens a switch ing the respective row of switches connected to each of the following terminals: 202, 204, 205 and 207. The opening of these switches interrupts the bias potential to the four associated trigger tubes, causing those tubes to conduct and establishing the representation of the numeral 3 in the decade counter. Release of a depressed numeral key closes those numeral selection switches which were opened by depression of the key, the counter unit maintaining its preset condition until advanced by counting pulses.

The instantaneous count of the counter unit is indicated by ten neon lamps, bearing the numerals 0–9 (Fig. 5), and connected through a resistance network to the anodes of the trigger circuit tubes. The resistance network is so connected that, as described in the above-mentioned R. C. A. Review, the instantaneously high or low anode voltages of the various tubes at any given count cause a voltage difference of illumination level across the one lamp corresponding to that count, illuminating only the one lamp appropriate to indicate the count.

During the calculation process, negative counting pulses originating in pulse generator 110 are received from gate unit 500 at input terminal 508 (Fig. 5) of the counter unit, advancing the preset counter to the tenth, or zero, count. During the advance from the ninth to the zero count, the right-hand section of tube 155 of trigger circuit 154 changes from a non-conducting to a conducting condition in accordance with the decade code. The right-hand anode of tube 155 is connected by an output terminal 156 to the magnetizing unit 600. Therefore, on the tenth, or zero, count when the right-hand section of tube 155 begins to conduct, its falling anode potential feeds a negative pulse into the magnetizing unit through terminal 156.

*Magnetizing unit*

Figure 7:
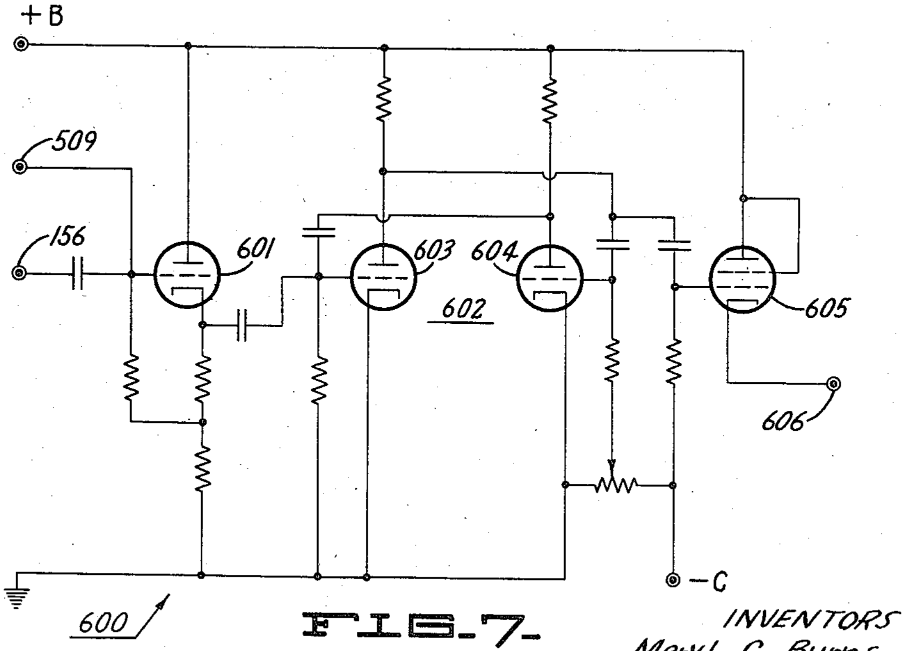
Fig. 7 is a wiring diagram of the magnetizing unit.

When the magnetizing unit is triggered at the end of a calculation, it closes gate unit 500, and shapes and amplifies a magnetizing pulse for magnetizing the slug 103 which represents the calculation result. The above-mentioned negative pulse output from the counter unit signifying the end of a calculation is received by the magnetizing unit at an input terminal 156 (Fig. 7) where it is capacitively coupled to an output terminal 509, thence to gate unit 500 (Fig. 4) closing that gate in the manner described hereinbefore. The negative pulse from terminal 156 (Fig. 7) is also impressed upon the control grid of a cathode follower 601 for relaying the pulse to the remainder of the magnetizing unit and for isolating the magnetizing unit from the counter unit. The resulting negative pulse at the cathode of tube 601 is electrostatically coupled to the control grid of a normally conducting tube 603 which, together with a normally nonconducting tube 604, forms a univibrator 602 of the type fully described in connection with the pulse former unit 400. The negative pulse from tube 601 triggers the univibrator, causing tube 603 to be cut off, temporarily, in the manner described hereinbefore in connection with the pulse former unit. The resulting temporary rise in the anode potential of tube 603 constitutes an approximately rectangular positive pulse which is coupled to the control grid of a tetrode cathode follower 605. Tube 605 is normally biased below conduction by a source —C of negative potential.

During a calculation, the magnetizing coil 101 (Figs. 1 and 6) is connected into the cathode circuit of tube 605 (Fig. 7) in the following manner. One end of coil 101 (Fig. 6) is grounded and the other end is connected to one side of a switch 221 which is closed by the add key 241. The other side of switch 221 is connected to terminal 606 (Figs. 6 and 7) and therefore completes the circuit from terminal 606 through coil 101 to ground. The output pulse from the cathode of tube 605 is therefore impressed across the magnetizing coil 101, and magnetizes the appropriate slug 103 in accumulator disc 100, as described hereinbefore.

*Discriminator unit*

The discriminator unit 700 receives the pulses which are induced on coil 102 by the magnetized slug and amplifies and shapes these pulses. The shaped pulses are employed by the discriminator unit to perform two functions which, it will be recalled, are: (1) to actuate the stroboscopic system for display; and (2) when the add key and a numeral key have been depressed, to actuate the erasing unit for demagnetizing the magnetized slug and for starting the counter.

The circuit within the discriminator unit, for amplifying and shaping the double-ended pulses from coil 102, comprises a pentode amplifier tube 702 (Fig. 8), a pentode discriminator tube 703, and two amplifier tubes 707 and 708. Each pulse from coil 102 is fed to input terminal 701 of the discriminator unit, where the pulse is coupled to the control grid of amplifier tube 702. Tube 702 is biased to conduction and amplifies the entire pulse input, capacitively coupling the amplified pulse to the control grid of discriminator tube 703. Tube 703 is biased well below cutoff by a variable grid bias network comprising a fixed resistor 704 in series with a potential divider resistor 705 which is connected between ground and a —C source 706. Tube 703 is biased to conduction during only the positive peak of the double-ended pulse received on its control grid from tube 702. The anode output of tube 703, which is therefore a negative pulse, is coupled to the respective control grids of the two amplifiers, 707 and 708. These tubes divide the discriminator unit output, and feed one output to the erasing unit and the other to the stroboscopic display system.

Tube 708 is normally conducting and amplifies each pulse from tube 703, and feeds its positive pulse output through a terminal 709 to the stroboscopic system as previously described.

The discriminator unit output circuit for energizing the erasing unit comprises amplifier tubs 707, the control grid of which is normally grounded through a terminal 710 (Figs. 8 and 6), a lead 222, a pair of normally closed switches 223 and 226, and a lead 229. Therefore, the pulses from tube 703 to the control grid of tube 707 are normally shorted to ground and have no effect upon the conduction of the latter tube. Depression of the add key opens switch 223, disconnecting the control grid of tube 707 from ground so that the subsequent negative pulses from tube 703 are amplified by tube 707. The positive pulse output from the anode of tube 707, while the add key is held depressed, is fed to the erasing unit 800 at a terminal 711.

A voltage steadying network comprising parallel capacitors 712 and 713 is connected between the +B voltage supply line 714 and ground.

*Erasing unit*

The erasing unit 800 (Fig. 1) consists of a normally closed one-shot gate circuit, a trigger circuit for opening and closing the gate, a univibrator, and an amplifier, all described below. Depression of any numeral key sets the trigger circuit, thereby opening the gate. The first pulse through the gate causes reversal of the trigger circuit to close the gate, and also triggers the univibrator. The univibrator forms a pulse of predetermined shape and feeds it to the amplifier which feeds the amplified pulse to the erase coil to demagnetize the magnetized slug.

It will be recalled that depression of any numeral key 210–219 (Fig. 6) opens a plurality of switches including a respective one of the ten switches in one or the other of the rows of switches between the terminal 201 or terminal 202 and the negative potential source 209. When any one of the above-mentioned ten switches is opened, an associated contact 232 which is connected to the control grid of a normally conducting tube 233 is closed. Connection of any one of the said switch arms to its associated contact 232 impresses the negative potential of source 209 on the control electrode of tube 233, biasing that tube below conduction. A solenoid 234 in the plate circuit of tube 233 is normally energized by the plate current, maintaining the contacts of a switch 235 closed. When tube 233 is biased to cut off by depression of a numeral key, the anode current through that tube ceases, coil 234 is de-energized, and switch 235 is allowed to open.

Switch 235 is connected between a pair of terminals 801 and 802 (Figs. 6 and 9), and when closed it completes, to ground, the cathode circuit of a tube 803 in the above-mentioned trigger circuit, which is of conventional Eccles-Jordan type and which comprises a normally conducting tube 803 and a normally non-conducting tube 804. When switch 235 is opened by depression of a numeral key, conduction in tube 803 is stopped, shifting the trigger circuit conduction to tube 804, thereby lowering the anode potential of the latter tube.

The anode of tube 804 is connected by a lead 805 to the control grid of a normally conducting gating tube 806. Tubes 806 and 807, the latter of which is normally biased well below cut-off, form a gate circuit of the type fully described as a part of gate unit 500. The lowered anode potential of tube 804 biases tube 806 to decreased conduction, lowering its cathode potential and raising the bias of tube 807 to slightly below cut-off, thereby opening the gate in the manner described hereinbefore.

The above-mentioned positive pulse, which is fed from terminal 711 (Fig. 8) of the discriminator unit 700 during depression of the add key, is received in the erasing unit at terminal 711 (Fig. 9) and is capacitively coupled to the control grid of tube 807. Thus, after the gate in the erasing unit is caused to open by depression of an integer key, the first positive pulse fed from the discriminator unit to tube 807 is amplified by that tube. The resulting negative pulse on the anode of tube 807 is coupled to the control grid of a cathode follower tube 808 which is normally biased to saturation. The resulting negative pulse at the cathode of tube 808 is coupled to the control grid of tube 804, biasing tube 804 to cut off and shifting the trigger circuit conduction back to tube 803. It will be recalled that conduction in tube 803 was stopped by depression of an integer key, which is released prior to depression of the add key, so that tube 803 is again enabled to conduct when the above-mentioned pulse is amplified by gate tube 807 to reverse conduction in the trigger circuit. When tube 804 is cut off by the pulse from tube 808, its anode potential rises and is impressed upon the control grid of tube 806, biasing the latter tube to increased conduction and closing the gate. Therefore, only one pulse is passed through the gate, so that only the one appropriate slug 103 will be demagnetized.

The single negative pulse output from the anode of tube 807 also triggers the following circuit for generating a demagnetizing pulse. This negative pulse is coupled, by a lead 809 and a capacitor 810, to the control grid of a normally conducting tube 811. Tube 811 and a second tube 812 form a univibrator of the type fully described hereinbefore. The formed positive pulse output from the anode of tube 811 is coupled to the control grid of a tetrode cathode follower 813. The erase coil 102 is connected between a terminal 814 and ground and forms the cathode impedance of tube 813 in the same manner as described in connection with the magnetizing coil 101 and magnetizing unit 600. Therefore, tube 813 forms a demagnetizing pulse across coil 102, demagnetizing the magnetized slug.

Recapitulating, depression of an integer key opens the one-shot gate in the erasing unit. Subsequent depression of the add key opens the gate in the discriminator unit. After the add key has been depressed, the first time the magnetized slug 103 induces a pulse on coil 102, the pulse is fed through the discriminator unit and the erasing unit, closing the one-shot gate in the erasing unit and demagnetizing the magnetized slug.

When the above described univibrator in the erasing unit is triggered, the negative pulse from the anode of tube 812, due to the temporary conduction of that tube, is coupled to gate unit 500 at an output terminal 507 and opens the gate unit in the manner described hereinbefore, allowing pulses from the pulse former unit to enter the counter unit.

*R. F. stroboscope oscillator*

It will be recalled that the stroboscopic lamp 131 in the numeral drum 130 may be lighted with bursts of R. F. current. If R. F. pulsing is to be employed, the above mentioned positive pulses from terminal 709 of the discriminator unit are fed to the R. F. oscillator unit 1000 where they are shaped and amplified to drive an oscillator.

Figure 10:
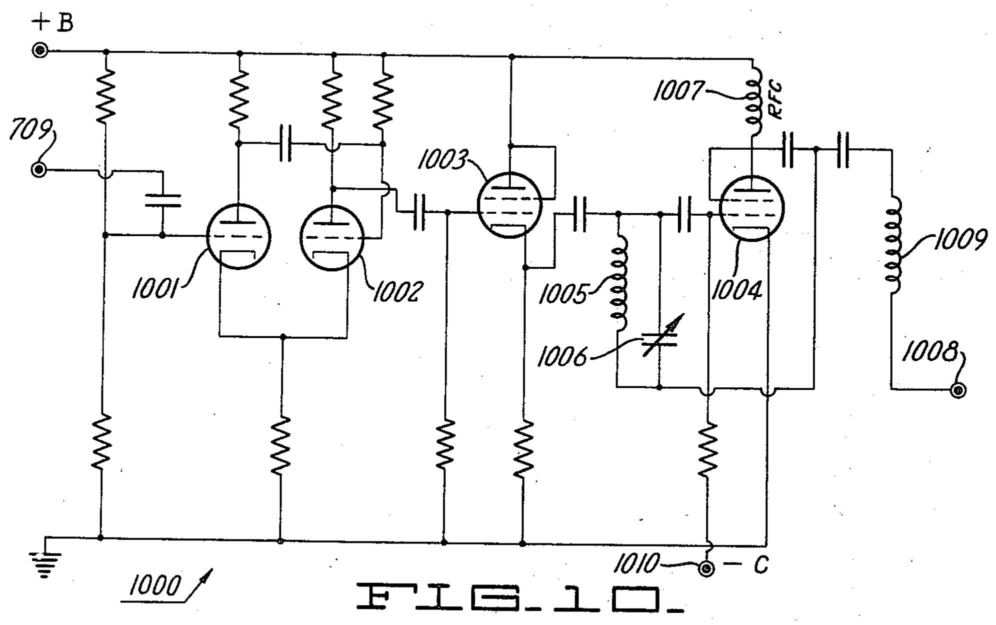
Fig. 10 is a wiring diagram of the R. F. oscillator unit.

The positive pulse output from terminal 709 of the discriminator unit (Fig. 8) is received at terminal 709, of the R. F. oscillator unit (Fig. 10) and is coupled to the control grid of normally non-conducting tube 1001. Tube 1001, and a normally conducting second tube 1002, form a univibrator of the general type described hereinbefore. Each positive pulse on terminal 709 biases tube 1001 to conduction, causing tube 1002 to be cut off temporarily. While tube 1002 is cut off its anode potential rises, forming a shaped positive pulse. The positive pulse from the anode of tube 1002 is coupled to the control grid of a tetrode cathode follower 1003 which isolates the univibrator from an R. F. oscillator. The resulting positive pulse on the cathode of tube 1003 is coupled to the control grid of a tube 1004. Tube 1004 forms a triggered grid tuned R. F. oscillator with a tank circuit comprising an inductance 1005 and a variable capacitance 1006. An R. F. choke 1007 in the anode circuit of tube 1004 forms the anode load for that tube. Tube 1004 is normally biased below conduction by a −C grid bias source 1010 and therefore oscillates only for the duration of each positive pulse it receives from tube 1003. The R. F. output of tube 1004 is coupled to the stroboscopic lamp 131 at a terminal 1008. An inductance 1009 is in series with the aforesaid coupling and is of such a value that it forms a series resonant circuit with the lamp capacitance, thereby increasing the illumination voltage across the lamp and resulting in a brighter light.

*Clearance*

The entire machine is cleared by depression of a single clear key which performs four functions, viz: (1) It opens the above described gate in the discriminator unit 700. (2) It opens the above described one-shot gate in the erasing unit 800. (3) It disables gate unit 500. (4) It actuates an indexing unit 900 for re-indexing the accumulater disc 100 to a "zero" representation.

Figure 8:
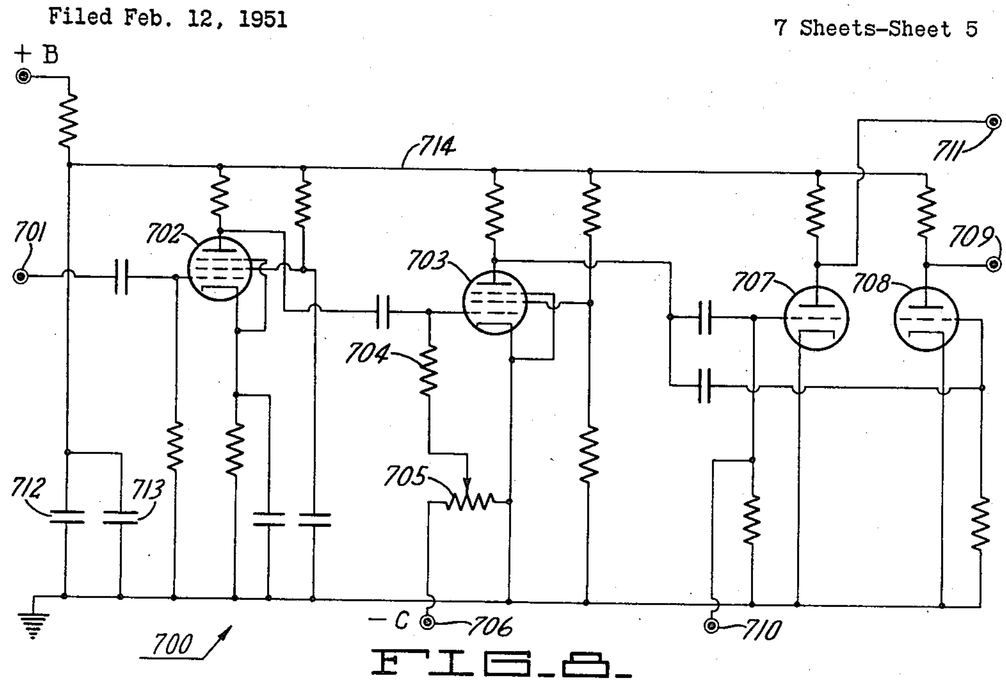
Fig. 8 is a wiring diagram of the discriminator unit.
Figure 9:
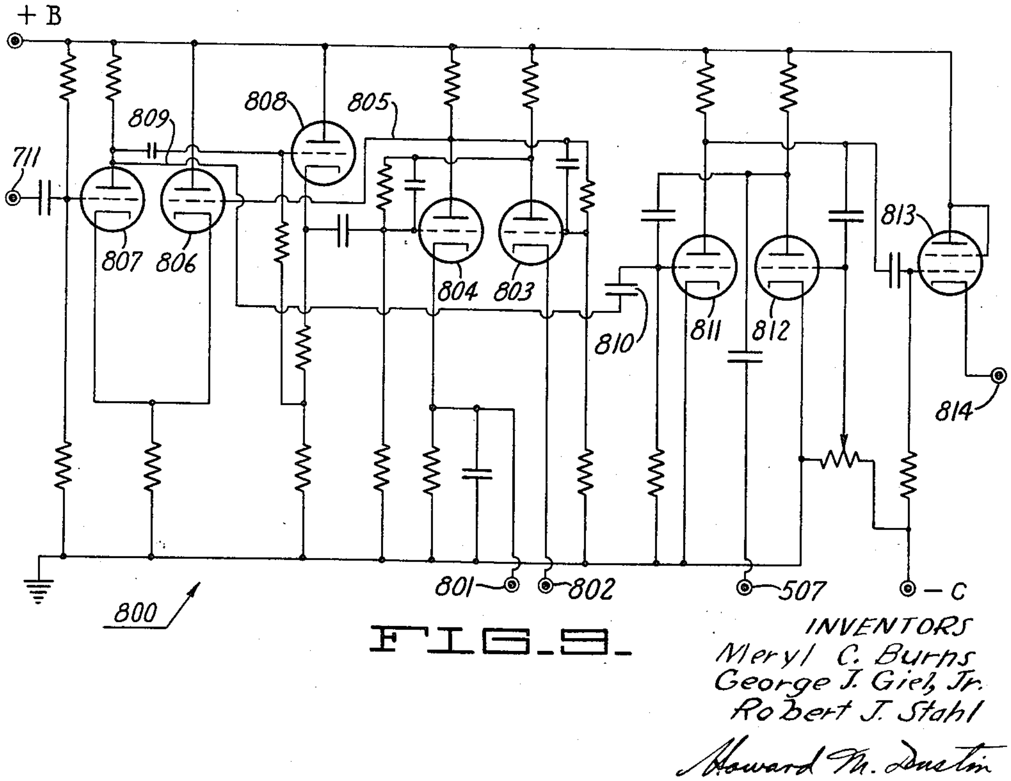
Fig. 9 is a wiring diagram of the erasing unit.

Depression of the clear key 240 (Fig. 6) opens a normally closed switch 226, interrupting the circuit between terminal 710 (Figs. 6 and 8) and ground, whereupon the control grid of tube 707 (Fig. 8) is no longer shorted to ground and the discriminator unit gate is opened, as described hereinbefore, passing pulses from tube 703 through tube 707 to terminal 711, and the terminal of the same number in the erasing unit (Fig. 9).

Depression of the clear key also temporarily closes a switch 228 (Fig. 6) connecting the negative potential source 209 to the control grid of tube 233 by the completed circuit comprising leads 238 and 236, switch 228 and lead 237. Therefore, the closure of switch 228 biases tube 233 below conduction, allowing switch 235 to open as hereinbefore described, and opening the one-shot gate in the erasing unit 800.

With the gates in both the discriminator unit and the erasing unit opened by the clear key, the pulse induced on coil 102 by the magnetized slug 103 in disc 100 is passed through both the discriminator and the erasing units and causes demagnetization of the magnetized slug in the manner hereinbefore described.

Figure 4:
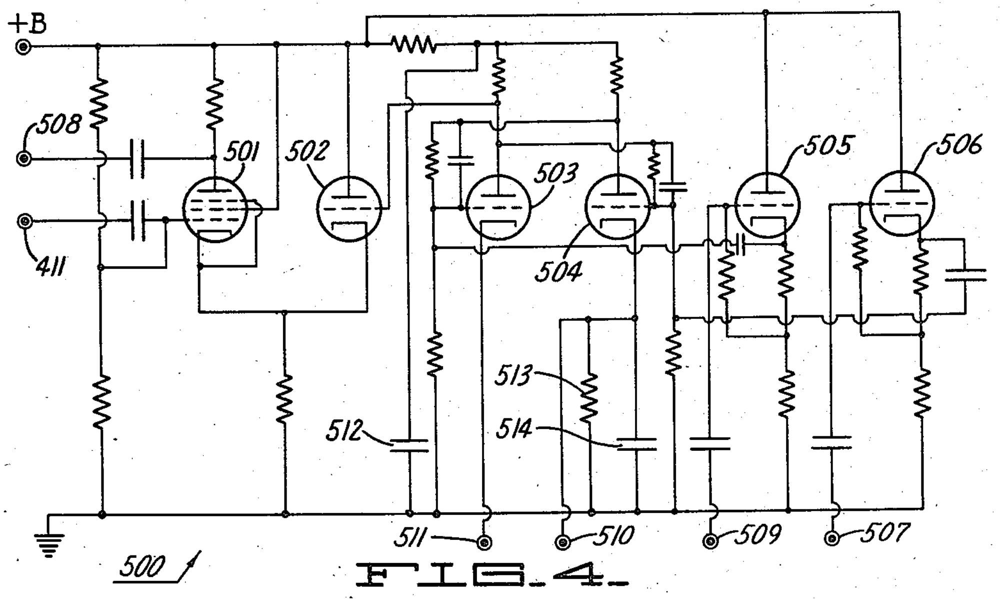
Fig. 4 is a wiring diagram of the gate unit.

It will be recalled that the above mentioned pulse through the erasing unit 800 during a calculation causes an opening pulse to be fed from the erasing unit to gate unit 500, opening the gate unit to admit counting pulses into counter unit 150. It will be obvious that during clearance, the gate unit should not be opened, since the counter must not be advanced during this operation. To disable the gate unit, depression of the clear key opens a switch 227 (Fig. 6) interrupting the circuit between terminals 510 and 511. These terminals and the switch 227 are in series in the cathode circuit of trigger circuit tube 503 (Fig. 4). Therefore, when switch 227 is opened, tube 503 cannot be caused to conduct and consequently does not open the gate unit.

Depression of the clear key also opens a fourth switch 225 to actuate an indexing unit 900 (Fig. 1) described immediately hereinafter.

*Indexing unit*

The indexing unit 900 receives a double-ended index pulse from the pick-up plates 122 and 123 (Fig. 1) of index disc 120 each time the single arm 121 of disc 120 passes between those plates. The index unit amplifies and clips the index pulse, and employs it for triggering a univibrator. When the clear key is depressed, the formed univibrator output pulse is amplified and fed to the index coil 104 for magnetizing the zero slug.

Figure 11:
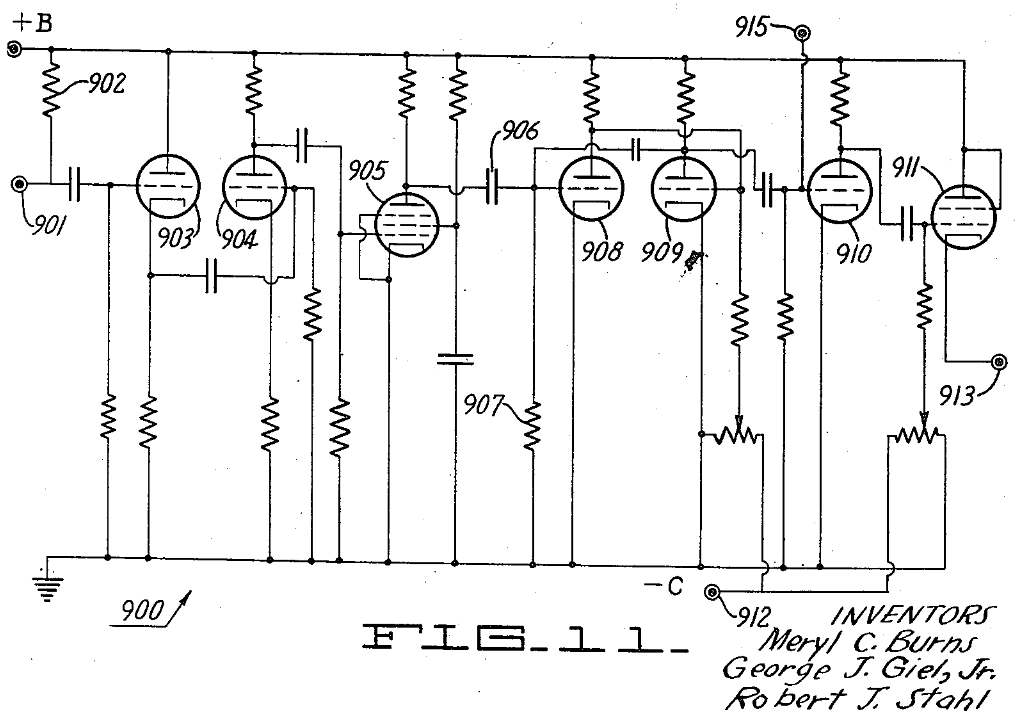
Fig. 11 is a wiring diagram of the indexing unit.

The input terminal 901 (Fig. 11) connects the ungrounded pickup plate, i. e., plate 123 (Fig. 1) of the index disc 120 to a +B source through an impedance 902 (Fig. 11). Each time the arm 121 of disc 120 passes between plates 122 and 123, a capacitive circuit is completed from +B through impedance 902, terminal 901, plate 123, arm 121, and plate 122 to ground, causing a pulse of current to flow from +B toward ground while the area of incidence between arm 121 and the plates 112 and 113 increases, and from ground toward +B as the incident area subsequently decreases. The current pulses through impedance 902 cause directional voltage drops across that impedance, resulting in a double-ended pulse at terminal 901. This pulse is capacitively couped to the control grid of a cathode follower tube 903, which amplifies the weak, high impedance input pulse from the electrostatic disc 120 to a low impedance cathode output pulse. The output pulse from tube 903 is coupled to the control grid of an amplifier tube 904, and the anode output of amplifier 904 still a double-ended pulse, is coupled to the control grid of a pentode discriminator 905 which is biased to saturation. The positive half of the double-ended pulse fed to tube 905 has negligible effect upon its conduction, since that tube normally conducts at saturation. However, the negative part of the pulse biases tube 905 below conduction so that its anode output is a substantially rectangular positive pulse.

The anode output from tube 905 is fed to a differentiating network comprising a series capacitor 906 and a resistor 907 which is connected to ground. The differentiated pulse, comprising a leading sharp positive pulse and a trailing sharp negative pulse, is impressed upon the control grid of a normally conducting tube 908. Tube 908, and a normally non-conducting companion tube 909 form a univibrator of the type described hereinbefore. The leading positive pulse input to tube 908 has no effect upon its conduction since that tube is normally conducting at saturation. However, the trailing negative pulse biases tube 908 to cut off, triggering the univibrator which develops a shaped negative pulse output from the anode of tube 909 in the manner fully described hereinbefore. The negative pulse output from the univibrator is coupled to the control grid of an amplifier tube 910.

The control grid of tube 910 is normally grounded through a terminal 915 (Figs. 11 and 6), normally closed switch 225, and lead 229. Therefore, the pulses impressed upon the control grid of tube 910 are normally shunted to ground through the above described low impedance circuit and have negligible effect upon the conduction of that tube. However, as mentioned above, depression of the clear key opens switch 225, interrupting the short circuit from terminal 915 to ground and permitting the input pulses to tube 910 to be amplified by that tube. As each negative pulse is amplified by tube 910, the positive pulse anode output of that tube is coupled to the control grid of a tetrode cathode follower 911 which is normally biased below conduction by a —C source 912. The index coil 104 (Fig. 1) constitutes the cathode impedance of tube 911 and is connected between a terminal 913 and ground. The output pulse at the cathode of tube 911 which is therefore generated in response to the travel of the index arm 121 between pickup plates 122 and 123, is a substantially rectangular current pulse and occurs within a few microseconds after the beginning of that travel. Rotation of arm 121 of disc 120 is synchronized with the rotation of the zero slug on disc 100, as described hereinbefore, so that the pulse across index coil 104 occurs during the passage of the zero slug 103 adjacent to that coil, and magnetizes the zero slug in preparation for a new calculation.

*Alternate embodiment*

It has been found that by substituting a movable magnetizing coil for the fixed coil hereinbefore described, the machine may be considerably simplified. This embodiment of the invention is now disclosed and claimed in U. S. patent application Serial No. 591,932, filed 18 June 1956.

Figure 12:
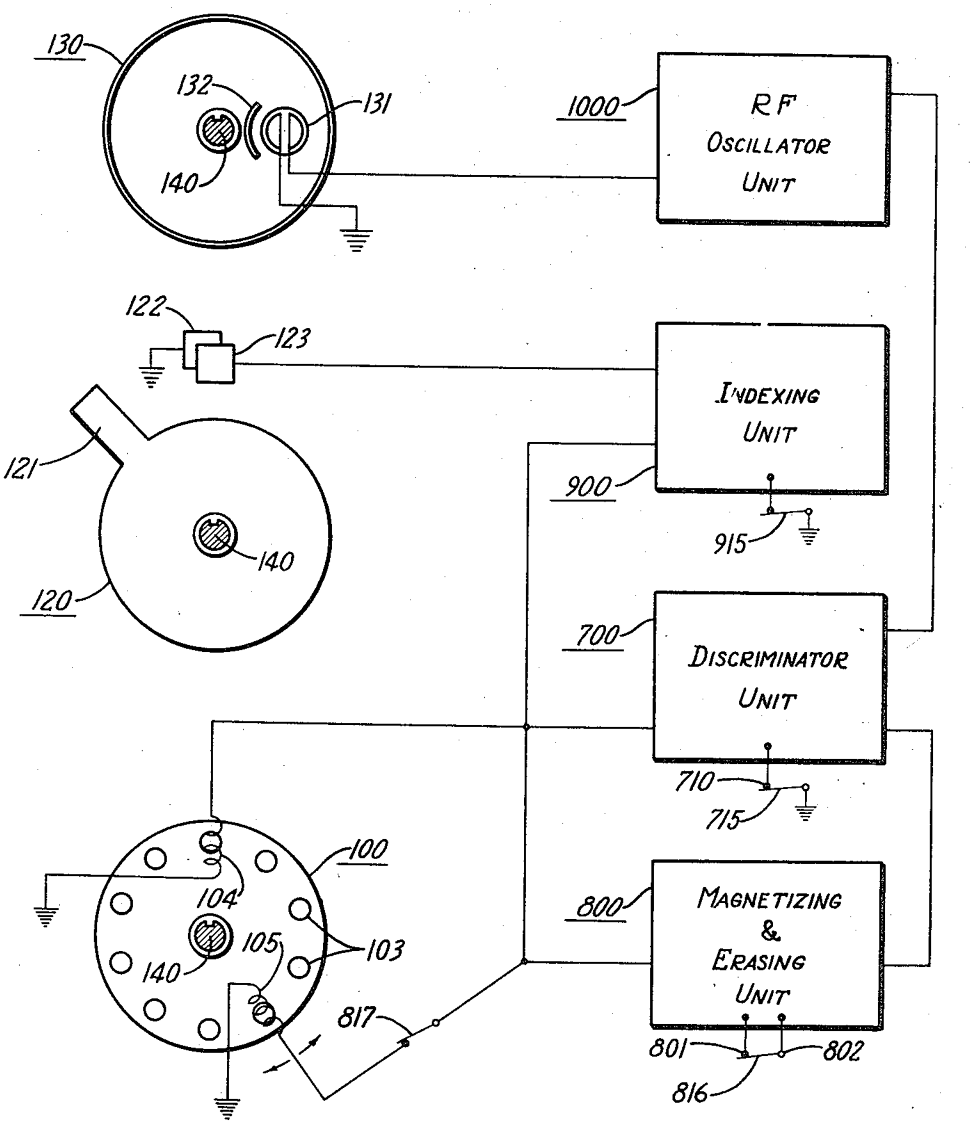
Fig. 12 is a block diagram of a second embodiment of the invention schematically illustrating the principal mechanical parts and electronic units of the machine.

Referring to Fig. 12, the accumulator disc 100, the index disc 120 and the numeral drum 130 are fixed to, and rotate together with the shaft 140 in the manner described hereinbefore. Assuming that one of the ten slugs 103 on disc 100 is magnetized, the calculation operation is as follows:

An integer is selected by moving a magnetizing coil 105 to the appropriate one of ten circumferential positions around shaft 140. Each such position corresponds to a respective integer 0–9 and is located adjacent its associated slug 103 when the zero slug is in the "zero" position, i. e., adjacent the coil 104, described above. Selection of any integer is also effective to open a one-shot gate in a magnetizing and erasing unit 800. Subsequent depression of the add key is effective to initiate the calculation by opening a gate in a discriminator unit 700. After the add key is depressed, the first time the magnetized slug 103 passes adjacent coil 104, it induces a pulse on that coil and the pulse energizes the discriminator unit 700. The discriminator unit thereupon energizes the magnetizing and erase unit 800, which induces a pulse on each of the coils 104 and 105, erasing the magnetized slug and magnetizing another slug, the latter slug representing the sum of the accumulated integer and the selected integer. For example, if the number 2 slug were previously energized and coil 105 is set, by the selection process, to the number 4 position, then when the calculation process is started, with the number 2 slug adjacent coil 104, the number 6 slug is adjacent coil 105 and is magnetized during the calculation, while coil 104 demagnetizes the number 2 slug. Thereafter, the number 6 slug, being the magnetized slug, becomes the index for the next operation.

Discriminator unit 700 is identical to that described hereinbefore and shown in Fig. 8. The discriminator gate is opened, as described above, by disconnecting terminal 710 from ground. Fig. 12 illustrates a switch 715, connected between terminal 710 and ground, and operable by depression of either the add key or the clear key to perform the aforesaid disconnection.

The magnetizing and erasing unit 800 is identical to the above described erasing unit 800 (Fig. 9). The one-shot gate in unit 800 is opened, as described hereinbefore, by temporarily disconnecting terminal 801 from terminal 802. Fig. 12 illustrates a switch 816 normally connecting terminals 801 and 802, and temporarily opened either by the selection of any integer or depression of the clear key.

The display system is also identical to that described hereinbefore. One output of discriminator unit 700 is fed to stroboscopic lamp 131 either directly or through R. F. oscillator unit 1000; and numeral drum 130 rotates with shaft 140 in synchronism with disc 100.

The indexing system is substantially identical to that described in the first embodiment. Coil 104 is connected to the output of indexing unit 900 and serves as the index coil. Index disc 120 rotates with shaft 140 in synchronism with disc 100. Arm 121 is phased to pass between its associated pick-up plates 122 and 123 at the same time the zero slug 103 passes tangent to coil 104. As mentioned above, depression of the clear key operates switches 715 and 816 (Fig. 12), opening the gate in the discriminator unit and the one-shot gate in the magnetizing and erasing unit respectively. Thereafter, the magnetized slug 103 is detected by coil 104 and the pulse therefrom is fed through units 700 and 800, triggering unit 800, which feeds a pulse back to coil 104 to demagnetize the magnetized slug. Depression of the clear key also opens a normally closed switch 817 between the magnetizing and erasing unit 800, and magnetizing coil 105, preventing the pulse output of unit 800 from causing coil 105 to magnetize a slug 103.

Finally, depression of the clear key operates the above-described switch 915 of indexing unit 900, enabling the indexing unit. Thereafter, when arm 121 of disc 120 passes between plates 122 and 123, the pulse thereby generated triggers unit 900 which feeds a pulse to coil 104 to magnetize the zero slug.

We claim:

1. In a device of the class described, the combination of a moving magnetic medium having a portion thereof magnetized, detection means including a coil positioned adjacent the path of said medium and operable in response to movement of said magnetized portion past said coil to energize the detection means, with demagnetizing means including an erasing circuit coupled to the detection means and actuated thereby to generate a demagnetizing pulse in response to said energization of the detection means, and a coupling between the erasing circuit and said coil for conducting said demagnetizing pulse to said coil for demagnetizing said magnetized portion.

2. In a device of the class described, the combination of a moving magnetic medium having a portion thereof magnetized, detection means including a coil positioned adjacent the path of said medium and operable in response to movement of said magnetized portion past said coil to energize the detection means, an erasing circuit effective when actuated to generate a demagnetizing pulse, operation initiating means to enable the detection means to actuate said erasing circuit in response to energization of said detection means, and a coupling between the erasing circuit and said coil for conducting said demagnetizing pulse to said coil for demagnetizing said magnetized portion.

3. In a device of the class described, the combination of, a moving magnetic medium having a portion thereof magnetized, detection means including a coil positioned adjacent said medium and operable in response to movement of said magnetized portion past said coil to cause the detection means to generate an actuating pulse, demagnetizing means including an erasing circuit effective upon actuation thereof to generate a demagnetizing pulse, a normally closed gate connected in series with the detection means and the erasing circuit, devices including an initiating mechanism for opening said gate to couple said actuating pulse from the detection means to the erasing circuit to actuate the latter, and a connection from the erasing circuit to said coil for conducting said demagnetizing pulse to said coil to demagnetize said magnetized portion.

4. In a device of the class described, the combination of, a magnetic medium moving cyclically and having a portion thereof magnetized, detection means including a coil positioned adjacent the path of said medium and operable in response to each cycle of said magnetized portion past said coil to energize the detection means for generating an actuating pulse, an erasing circuit effective when actuated to generate a demagnetizing pulse, normally closed first and second gates in series for coupling the detection means and the erasing circuit, said gates being effective when both are opened to couple an actuating pulse to the erasing circuit to actuate the latter, a selectively operable device for opening said first gate, an initiating means for opening said second gate, control means for said first gate for closing the same in response to the first one of said actuating pulses, and a coupling between the erasing circuit and said coil to conduct said demagnetizing pulse to said coil for demagnetizing said magnetized portion.

5. In a device of the class described, the combination of a moving magnetic medium having a portion thereof magnetized; detection means including a first coil positioned adjacent the path of said medium and operable in response to movement of said magnetized portion past said first coil to energize the detecting means, magnetizing means including, a delay circuit coupled to the detecting means and actuated in response to energization of the latter to generate a magnetizing pulse after a predetermined time delay following said actuation, a second coil positioned adjacent said path, a coupling between the delay circuit and the second coil to transmit said magnetizing pulse to said second coil to thereby magnetize a second portion of said medium, and selection means connected to said delay circuit for predetermining the length of said delay time.

6. In a device of the class described, the combination of a moving magnetic medium having a portion thereof magnetized, detection means including a first coil positioned adjacent the path of said medium and operable in response to movement of said magnetized portion past said first coil to energize the detection means, demagnetizing means including an erasing circuit coupled to said detection means and actuated thereby to generate a demagnetizing pulse in response to said energization of the detection means, a coupling from the erasing circuit to the first coil for conducting the demagnetizing pulse to the first coil to demagnetize said magnetized portion; with magnetizing means including a delay circuit coupled to the detection means and triggered in response to said energization of the detecting means to generate a magnetizing pusle after a predetermined time delay following said triggering, a second coil positioned adjacent said path and effective when energized to magnetize a second portion of said medium, means coupling the second coil and the delay circuit for enabling said magnetizing pulse to energize said second coil, and selection means for predetermining the length of said time delay.

7. In a device of the class described, the combination of a moving magnetic medium having a portion thereof magnetized, detection means including a first coil positioned adjacent the path of said medium and operable in response to movement of said magnetized portion past said first coil to cause the detecting means to generate an actuating pulse, demagnetizing means including an erasing circuit coupled to said detection means and actuated thereby to generate a demagnetizing pulse in response to said energization of the detection means, a coupling from the erasing circuit to the first coil for conducting the demagnetizing pulse to the first coil to demagnetize said magnetized portion; with a counter selectively settable to operate through a predetermined number of counts and effective at the end of said count to generate a triggering pulse, means coupling said detecting means and the counter to conduct said actuating pulse to the counter to initiate operation of the latter, a magnetizing circuit coupled to said counter and responsive to said triggering pulse to generate a magnetizing pulse, a second coil positioned adjacent said path and effective when energized to magnetize a second portion of said medium and means coupling the magnetizing circuit and the second coil for enabling said magnetizing pulse to energize said second coil.

8. In a device of the class described having a moving magnetic accumulator with a plurality of magnetizable portions, one of said portions being magnetized to represent a numeral value, a decade counter, and selection means connected to the counter for conditioning the latter for a number of counts representing a second numeral value; the combination of, a circuit for generating a shaped counting pulse in synchronism with the movement of each of said portions past a fixed point in space, a normally closed gate coupled between the counter and said generator and effective when opened to couple pulses from the generator to the counter for advancing the latter through said number of counts, an actuating circuit including a detection device associated with the accumulator and energized to generate an actuating pulse in response to movement of said magnetized portion past said detection device, and means coupled to the actuating circuit and operable in response to said actuating pulse for energizing said detection device to demagnetize the magnetized portion of the accumulator; with coupling means between the actuating circuit and the gate, a calculation initiating means for enabling said coupling means to open the gate in response to said actuating pulse, means constituting a second coupling between the counter and the gate and energized by the counter upon completion of said number of counts to close the gate, a magnetizing circuit connected to the counter and triggered thereby upon completion of said number of counts to generate a magnetizing pulse, a magnetizing coil positioned adjacent the accumulator, and a coupling between the magnetizing circuit and the magnetizing coil for transmitting said magnetizing pulse to the magnetizing coil to thereby magnetize a portion of said accumulator representing the sum of the two aforesaid numeral values.

9. In a device of the class described having a moving magnetic accumulator including a plurality of magnetizable portions, one of said portions being magnetized to represent a numeral value, a decade counter, and a value entry mechanism for setting the counter to a condition representing a second numeral value; the combination of, detection means including a first coil positioned adjacent the path of said accumulator and operable in response to movement of said magnetized portion past said first coil to energize the detection means, demagnetizing means including, an erasing circuit coupled to said detection means and actuated thereby to generate a demagnetizing pulse in response to said energization of the detection means, and a coupling from the erasing circuit to said first coil for conducting the demagnetizing pulse to the first coil to demagnetize said magnetized portion; with a device for generating a counting pulse in synchronism with the movement of each of said portions of the accumulator past said first coil, a normally closed gate coupling the generating device and the counter and effective when opened to conduct each counting pulse to the counter for advancing the latter one count, a circuit controlled by said detecting means upon energization thereof to open said gate, means constituting a second coupling between the counter and the gate and operable under control of the counter to close the gate in response to completion of a number of counts corresponding to said selected value, a magnetizing circuit connected to the counter and triggered thereby upon completion of said count to generate a magnetizing pulse, a second coil positioned adjacent the path of said accumulator, and a coupling between the magnetizing circuit and the second coil for conducting the magnetizing pulse to the second coil to thereby magnetize a portion of said accumulator representing the sum of the two aforesaid numeral values.

10. In a device of the class described having a moving magnetic accumulator with a plurality of magnetizable portions evenly spaced in the direction of movement of said accumulator, one of said portions being magnetized, detection means energized by movement of said magnetized portion tangent to a part of said detection means, a numeral value selection mechanism, a calculation initiating mechanism, and a demagnetizing circuit coupled to the detection means and enabled by operation of both said selection mechanism and said calculation initiating mechanism to demagnetize said magnetized portion in response to said energization of the detection means; the combination of, a generator synchronized with the movement of said accumulator to generate a counting pulse simultaneously with the movement of each of said portions tangent to said part of the detection means, a decade counter conditioned by said operation of the selection mechanism for a number of counts corresponding to a selected numeral value, a normally closed gate coupled between said counting circuit in said generator and effective when opened to conduct the counting pulses from the generator to the counter to advance the latter one count for each such pulse, means coupling the gate and the detection means and responsive to said energization of the detection means to open the gate, and means constituting a second coupling between the counter and the gate and energized by the counter upon the completion of said number of counts to close the gate, with a magnetizing circuit coupled to the counting circuit and triggered thereby upon the completion of said number of counts to generate a magnetizing pulse, a magnetizing coil adjacent the path of said accumulator, and a normally open switch connecting the magnetizing coil to the magnetizing circuit and closed by said operation of the calculation initiating mechanism to conduct the magnetizing pulse to the magnetizing coil for magnetizing a second portion of the accumulator.

11. In a device of the class described having a decade counter and a selection mechanism connected to the counter for presetting the latter to a condition representing a selected numeral value; the combination of, a pulse generator, a normally closed gate connected between the generator and the counter and effective when opened to couple the pulses from said generator to the counter for advancing the latter a number of counts corresponding to said selected numeral value, accumulator means for generating a signal representing a second numeral value, an arming circuit coupling the accumulating means and the gate, selectively operable control means for enabling said arming circuit to couple said signal to the gate for arming the latter, and a feedback circuit connected between the arming circuit and the accumulating means and energized by said signal to nullify the value-representing condition of the accumulating means; with a coupling between the counter and the gate and energized by the counter upon completion of said number of counts to close the gate, and a circuit coupling the counter to the accumulating means and energized in response to the completion of said number of counts for setting the accumulating means to a condition representing the sum of the aforesaid two numeral values.

12. In a device of the class described having a moving magnetic medium with a portion thereof magnetized and a detection means electrically energized by movement of said magnetized portion tangent to a part of said detection means; the combination of, devices for indexing said medium including, normally disabled demagnetizing means coupled to the detection means and associated with said medium, a selectively operable control member for enabling said demagnetizing means to demagnetize the magnetized portion of said medium in response to said energization of the detection means, an index coil adjacent the path of said medium, a generator synchronized with the movement of said medium to generate a signal simultaneously with the movement of an index portion of said medium tangent to said index coil, an indexing circuit coupled to the generator, a device including said selectively operable control means for enabling said indexing circuit to form a magnetizing pulse in response to said generated signal, and a coupling between the indexing circuit and the index coil for conducting said magnetizing pulse to said index coil to magnetize said index portion.

13. In a data storage system, the combination of, a moving magnetic medium having a portion thereof magnetized; detection means including a transducing head positioned adjacent the path of said medium and operable in response to movement of said magnetized portion past said head to energize the detection means; with means for changing the magnetization of said portion including a circuit coupled to the detection means and actuated thereby to generate a pulse in response to said energization of the detection means, and means for conducting said pulse from said circuit to the transducing head.

14. In a data storage system, the combination of, a moving magnetic medium having a portion thereof magnetized; detection means including a transducing head positioned adjacent said medium and operable in response to movement of said magnetized portion past said head to cause the detection means to generate an actuating pulse; means for changing the magnetization of said portion including a circuit effective upon actuation thereof to generate a pulse, a normally closed gate connected in series with the detection means and said circuit, means for opening said gate to couple said actuating pulse from the detection means to said circuit to actuate the latter, and means for conducting a pulse from said circuit to the transducing head.

15. In a data storage system, the combination of, a moving magnetic medium having a portion thereof magnetized; detection means including a first transducing head positioned adjacent the path of said medium and operable in response to movement of said magnetized portion past said first head to energize the detection means; an arithmetic unit; means for causing the arithmetic unit to assume a condition representing a selected numeral value; means effective upon energization of the detection means for causing the numeral value in the arithmetic unit to change by a predetermined amount; a circuit coupled to the arithmetic unit and effective in response to the completion of said change in numeral value in the arithmetic unit to generate a magnetizing pulse; a second transducing head positioned adjacent said path; and means for transmitting the magnetizing pulse from said circuit to the second head.

16. In a device of the class described, means for generating control pulses, a movable magnetic medium, means for moving said medium in timed relation with the operation of said pulse generating means, a magnetic head positioned adjacent the path of the medium, an arithmetic unit coupled to the control pulse generating means and adapted to represent any of a plurality of numeral values, means for entering a numeral value into the arithmetic unit, means for changing the numeral value standing in the arithmetic unit to represent a second value, and an energizing circuit coupling the arithmetic unit and the magnetic head and operable in response to at least one of said control pulses for energizing the magnetic head to magnetize the medium in a representation of said second value.

17. The device defined in claim 16, wherein the energizing circuit includes a gate.

18. In a device of the class described, means for generating control pulses, a movable magnetic medium, means for moving the medium in timed relation with the operation of said pulse generating means, an energizing circuit, means for counting the control pulses, means effective upon a predetermined count to initiate operation of the energizing circuit, a magnetic head positioned adjacent the path of said medium, and a coupling between the energizing circuit and the magnetic head operable in response to initiation of operation of the energizing circuit for causing the magnetic head to magnetize the medium in a representation of a function of the value of said predetermined count.

19. In a device of the class described, a moving magnetic medium having a first portion thereof magnetized, a magnetic reading head positioned adjacent the path of the medium and operable in response to movement of the magnetized portion past the reading head to generate an information signal, a magnetic writing head positioned adjacent the path of the medium and operable in response to the receipt of a signal for magnetizing a second portion of the medium, and means including a delay circuit interconnecting the reading and writing heads and operable in response to an information signal output from the reading head to delay said signal for a predetermined interval of time and apply the delayed signal to the writing head.

20. In a device of the type described; a medium adapted to manifest an item of information; a first transducer cooperating with said medium for producing a signal corresponding to said item; a second transducer operable in response to the receipt of a signal for impressing an informational manifestation upon said medium; and means including a delay circuit interconnecting the first and second transducers for receiving a signal from the first transducer, delaying said signal for a predetermined interval of time, and applying a signal to the second transducer following the delay interval.

21. In the device defined in claim 20, means for adjusting the delay circuit for predetermining said delay interval.

22. In a magnetic storage device, a continuously moving magnetic material having permanent magnetic characteristics, a transducing coil located adjacent the periphery of said material, apparatus including said coil responsive to the magnetic condition of an elemental area of said material as said area approaches said coil, control apparatus for changing the magnetic condition of said elemental area under control of said responsive apparatus during the same pass of said area adjacent said coil, and apparatus for maintaining the response of said responsive apparatus during the time said elemental area passes under said coil independently of any changes in the magnetic condition of said elemental area as it passes under said coil.

23. In a magnetic storage device, a continuously moving magnetic material having permanent magnetic characteristics, a transducing coil located adjacent the periphery of said material, apparatus including said coil responsive to the magnetic condition of an elemental area of said material as said area approaches said coil, control apparatus for changing the magnetic condition of said elemental area under control of said responsive apparatus, and apparatus operated incident to the changing of the magnetic condition of said elemental area for rendering a part of said responsive apparatus unresponsive to said changed condition.

24. In a storage device, a continuously moving surface of magnetic material having permanent magnet properties, a transducing coil, apparatus responsive to the magnetic condition of an elemental area of said surface as it approaches said coil, and other apparatus for changing the magnetic condition of said elemental area as said elemental area passes under said coil during the same pass of said elemental area.

25. In a storage device a continuously moving surface for storing representations of electrical pulses thereon, a transducing device located adjacent said surface, a triggering circuit, means for normally preventing current flowing through a part of said triggering circuit, connection between said triggering circuit and said transducing device, and signal responsive means for overcoming said first-mentioned means and causing said triggering circuit to apply a pulse to said transducing device to change the condition of said storage surface.

26. A storage device comprising at least one magnetizable spot; a pick-up device relatively movable with respect to said spot and responsive to the rate of change of magnetic flux due to the movement with respect to said spot; a transducing means; and a circuit control means operable in response to the operation of said pick-up device to energize said transducing means to change the magnetic flux of said spot during the same pass in which the rate of change of magnetic flux causes the response in said pick-up device.

27. In the art of recording and reproducing data represented as recorded by magnetized elemental areas on a magnetic medium, a magnetic medium having a surface; a transducing head having winding means thereupon and a working face; means to cause relative motion between the working face of said head and said surface, said winding means having a voltage induced therein due to the relative motion between said head and said surface by said first-mentioned means according to one or another condition of an elemental area of said surface; and means for applying a magnetization-changing current selectively to said winding means according to said one or another condition of said elemental area during the same pass of said head and said area.

References Cited in the file of this patent

UNITED STATES PATENTS

| | | |
|---|---|---|
| 2,298,608 | Bates | Oct. 13, 1942 |
| 2,482,039 | Thompson | Sept. 13, 1949 |
| 2,510,093 | Ferguson et al. | June 6, 1950 |
| 2,510,485 | Vossberg | June 6, 1950 |
| 2,533,326 | Putt | Dec. 12, 1950 |
| 2,540,654 | Cohen | Feb. 6, 1951 |
| 2,549,071 | Dusik et al. | Apr. 17, 1951 |
| 2,617,704 | Mallina | Nov. 11, 1952 |
| 2,700,148 | McGuigan et al. | Jan. 18, 1955 |

OTHER REFERENCES

A Magnetic Digital Storage System, Andrew D. Booth, "Electronic Engineering," July 1949, pages 235–238.

"Storage of Numbers on Magnetic Tape," J. M. Coombs, Proceedings of the National Electronic Conference, vol. III, Mar. 17, 1948, pages 201–209.

"Progress Report (2) on the Edvac"; Moore School, University of Penn., June 30, 1946, declassified Feb. 13, 1947. Pages 4–24 to 4–30.

Magnetic Drum Storage For Digital Information Processing Systems, A. A. Cohen; "Mathematical Tables and Other Aids to Computation"; Quarterly Journal, published by the National Research Counsel, January 1950, pages 31–39.